United States Patent
Holland et al.

(10) Patent No.: US 7,490,055 B2
(45) Date of Patent: Feb. 10, 2009

(54) IDENTIFICATION CARD MANUFACTURING SYSTEM SUPPLY ORDERING AND DIAGNOSTIC REPORT

(75) Inventors: Gary R. Holland, Edina, MN (US); David A. Fontanella, Jr., Plymouth, MN (US); Thomas A. Zappe, Fridley, MN (US); Mark D. Oeltjenbruns, Shakopee, MN (US); Steve P. Lohman, Minneapolis, MN (US); Joseph M. Wright, Eagan, MN (US); Gary M. Klinefelter, Eden Prairie, MN (US); Jeffrey J. Sasse, Chaska, MN (US); Stacy W. Lukaskawcez, Shakopee, MN (US); Thomas C. Platner, Eden Prairie, MN (US); Jon J. Ibs, Minneapolis, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 828 days.

(21) Appl. No.: 10/937,739

(22) Filed: Sep. 9, 2004

(65) Prior Publication Data

US 2005/0060239 A1    Mar. 17, 2005

Related U.S. Application Data

(60) Provisional application No. 60/501,932, filed on Sep. 11, 2003.

(51) Int. Cl.
*G06Q 30/00* (2006.01)
(52) U.S. Cl. .................................. 705/26
(58) Field of Classification Search ............ 705/26, 705/27
See application file for complete search history.

(56) References Cited

U.S. PATENT DOCUMENTS

| | | | |
|---|---|---|---|
| 3,193,430 A | 7/1965 | Messmer et al. | 156/355 |
| 3,446,415 A | 5/1969 | Bromley | 220/62 |
| 3,761,079 A | 9/1973 | Azure, Jr. | 271/116 |
| 3,887,106 A | 6/1975 | Charlson et al. | 221/197 |
| 3,889,472 A | 6/1975 | Guillaud | 60/698 |

(Continued)

FOREIGN PATENT DOCUMENTS

DE      FY 25 35 699 A1      3/1977

(Continued)

OTHER PUBLICATIONS

Anon., "Instantly Re-order Toner Cartridges Online Using HP's Smartchip," M2 Presswire, Oct. 19, 2001.*

(Continued)

*Primary Examiner*—Nicholas D Rosen
(74) *Attorney, Agent, or Firm*—Leanne Taveggia Farrell; Westman, Champlin & Kelly, P.A.

(57) ABSTRACT

In a method of ordering a consumable supply produced by a card manufacturing device of an identification card manufacturing system, a request to order the consumable supply is received from a user. Next, supply information relating to the supply is retrieved and the supply information is provided to a first web address. Finally, a second web address, which is different from the first web address and is associated with the supply, is retrieved through the first web address based upon the supply information.

19 Claims, 9 Drawing Sheets

U.S. PATENT DOCUMENTS

| | | | | |
|---|---|---|---|---|
| 3,960,072 | A | 6/1976 | Ahlgren et al. | 101/35 |
| 4,021,032 | A | 5/1977 | Gross et al. | 271/166 |
| 4,068,028 | A | 1/1978 | Samonides | 428/41.4 |
| 4,146,900 | A | 3/1979 | Arnold | 347/21 |
| 4,179,732 | A | 12/1979 | Khan et al. | 358/1.16 |
| 4,282,583 | A | 8/1981 | Khan et al. | 358/1.5 |
| 4,313,683 | A | 2/1982 | Brown et al. | 400/225 |
| 4,393,386 | A | 7/1983 | De Giulio | 347/4 |
| 4,471,885 | A | 9/1984 | Mucciarone | 221/155 |
| 4,534,313 | A | 8/1985 | Louvel | 118/696 |
| 4,604,631 | A | 8/1986 | Jinnai et al. | 347/9 |
| 4,617,080 | A | 10/1986 | Kobayashi et al. | 156/359 |
| 4,680,596 | A | 7/1987 | Logan | 347/15 |
| 4,685,702 | A | 8/1987 | Kazuharu | 283/81 |
| 4,686,540 | A | 8/1987 | Leslie et al. | 346/33 R |
| 4,716,346 | A | 12/1987 | Matsuo | 318/38 |
| 4,719,626 | A | 1/1988 | Ogasawara | 714/33 |
| 4,734,868 | A | 3/1988 | DeLacy | 58/1.12 |
| 4,750,743 | A | 6/1988 | Nicoletti | 273/148 A |
| 4,781,985 | A | 11/1988 | Desjarlais | 428/421 |
| 4,938,830 | A | 7/1990 | Cannistra | 156/270 |
| 4,961,088 | A | 10/1990 | Gilliland et al. | 399/25 |
| 5,018,614 | A | 5/1991 | Ruckert | 194/236 |
| 5,027,135 | A | 6/1991 | Negishi et al. | 347/134 |
| 5,161,233 | A | 11/1992 | Matsuo et al. | 399/136 |
| 5,184,181 | A | 2/1993 | Kurando et al. | 399/262 |
| 5,238,524 | A | 8/1993 | Seki et al. | 156/538 |
| 5,266,968 | A | 11/1993 | Stephenson | 347/172 |
| 5,267,800 | A | 12/1993 | Petteruti et al. | 400/88 |
| 5,277,501 | A | 1/1994 | Tanaka et al. | 400/120.18 |
| 5,290,067 | A | 3/1994 | Langen | 283/60.1 |
| 5,318,369 | A | 6/1994 | Ishii | 400/249 |
| 5,318,370 | A | 6/1994 | Nehowig | 400/613 |
| 5,326,179 | A | 7/1994 | Fukai et al. | 400/521 |
| 5,327,201 | A | 7/1994 | Coleman et al. | 399/362 |
| 5,368,677 | A | 11/1994 | Ueda et al. | 156/362 |
| 5,373,146 | A | 12/1994 | Lei | 235/382.5 |
| 5,378,884 | A | 1/1995 | Lundstrom et al. | 235/441 |
| 5,410,642 | A | 4/1995 | Hakamatsuka et al. | 358/1.14 |
| 5,412,779 | A | 5/1995 | Motoyama | 399/8 |
| 5,413,532 | A | 5/1995 | Raby | 462/2 |
| 5,437,960 | A | 8/1995 | Nagate et al. | 430/256 |
| 5,441,921 | A | 8/1995 | Verdonck et al. | 503/227 |
| 5,455,611 | A | 10/1995 | Simon et al. | 347/49 |
| 5,466,319 | A | 11/1995 | Zager et al. | 156/220 |
| 5,484,502 | A | 1/1996 | Bozanic | 156/235 |
| 5,516,218 | A | 5/1996 | Amano et al. | 400/535 |
| 5,537,554 | A | 7/1996 | Motoyama | 710/100 |
| 5,544,289 | A | 8/1996 | Motoyama | 710/100 |
| 5,550,735 | A | 8/1996 | Slade et al. | 700/99 |
| 5,550,984 | A | 8/1996 | Gelb | 709/245 |
| 5,552,994 | A | 9/1996 | Cannon et al. | 700/95 |
| 5,558,449 | A | 9/1996 | Morgavi | 400/188 |
| 5,568,618 | A | 10/1996 | Motoyama | 710/100 |
| 5,573,621 | A | 11/1996 | Boreali | 156/256 |
| 5,630,581 | A | 5/1997 | Rodesch | 271/23 |
| 5,637,174 | A | 6/1997 | Field et al. | 156/256 |
| 5,646,388 | A | 7/1997 | D'Entremont et al. | 235/380 |
| 5,649,120 | A | 7/1997 | Motoyama | 710/100 |
| 5,673,076 | A | 9/1997 | Nardone et al. | 347/171 |
| 5,695,589 | A | 12/1997 | German et al. | 156/250 |
| 5,709,484 | A | 1/1998 | Dorner | 400/188 |
| 5,709,485 | A | 1/1998 | Kohno | 400/208 |
| 5,715,381 | A | 2/1998 | Hamilton | 358/1.15 |
| 5,717,776 | A | 2/1998 | Watanabe | 382/116 |
| 5,727,137 | A | 3/1998 | LeClair et al. | 358/1.17 |
| 5,745,036 | A | 4/1998 | Clare | 340/572.1 |
| 5,758,184 | A | 5/1998 | Lucovsky et al. | 710/6 |
| 5,768,143 | A | 6/1998 | Fujimoto | 700/235 |
| 5,768,483 | A | 6/1998 | Maniwa et al. | 358/1.15 |
| 5,768,495 | A | 6/1998 | Campbell et al. | 714/25 |
| 5,771,058 | A | 6/1998 | Kobayashi | 347/218 |
| 5,771,071 | A | 6/1998 | Bradley et al. | 348/335 |
| 5,771,382 | A | 6/1998 | Wang et al. | 718/100 |
| 5,774,678 | A | 6/1998 | Motoyama | 710/100 |
| 5,783,024 | A | 7/1998 | Forkert | 156/351 |
| 5,785,224 | A | 7/1998 | Nowakowski | 225/4 |
| 5,790,162 | A | 8/1998 | Adams et al. | 347/222 |
| 5,796,420 | A | 8/1998 | Kaerts et al. | 347/188 |
| 5,805,810 | A | 9/1998 | Maxwell | 709/206 |
| 5,807,461 | A | 9/1998 | Hagstrom | 156/361 |
| 5,819,110 | A | 10/1998 | Motoyama | 710/15 |
| 5,822,534 | A | 10/1998 | Yamunachari et al. | 709/224 |
| 5,828,567 | A | 10/1998 | Eryurek et al. | 700/79 |
| 5,835,911 | A | 11/1998 | Nakagawa et al. | 707/203 |
| 5,837,991 | A | 11/1998 | LaManna et al. | 235/475 |
| 5,860,068 | A | 1/1999 | Cook | 705/26 |
| 5,862,260 | A | 1/1999 | Rhoads | 382/232 |
| 5,873,606 | A | 2/1999 | Haas et al. | 283/75 |
| 5,874,145 | A | 2/1999 | Waller | 428/42.1 |
| 5,884,014 | A | 3/1999 | Huttenlocher et al. | 358/1.15 |
| 5,886,334 | A | 3/1999 | D'Entremont et al. | 235/380 |
| 5,887,216 | A | 3/1999 | Motoyama | 399/8 |
| 5,889,866 | A | 3/1999 | Cyras et al. | 713/192 |
| 5,936,542 | A | 8/1999 | Kleinrock et al. | 340/5.61 |
| 5,941,414 | A | 8/1999 | Kasper | 221/210 |
| 5,941,522 | A | 8/1999 | Hagstrom et al. | 271/225 |
| 5,962,832 | A | 10/1999 | Dorner | 235/380 |
| 5,973,692 | A | 10/1999 | Knowlton et al. | 715/835 |
| 5,980,011 | A | 11/1999 | Cummins et al. | 347/4 |
| 6,022,429 | A | 2/2000 | Hagstrom | 156/64 |
| 6,033,832 | A | 3/2000 | Wingender | 430/373 |
| 6,070,146 | A | 5/2000 | Mimata | 705/13 |
| 6,100,804 | A | 8/2000 | Brady et al. | 340/572.7 |
| 6,182,136 | B1 | 1/2001 | Ramanathan et al. | 709/224 |
| 6,189,103 | B1 | 2/2001 | Nevarez et al. | 726/5 |
| 6,196,459 | B1 | 3/2001 | Goman et al. | 235/380 |
| 6,199,753 | B1 | 3/2001 | Tracy et al. | 235/375 |
| 6,219,669 | B1 | 4/2001 | Haff et al. | 707/10 |
| 6,220,511 | B1 | 4/2001 | Holec et al. | 235/380 |
| 6,233,683 | B1 | 5/2001 | Chan et al. | 713/172 |
| 6,272,472 | B1* | 8/2001 | Danneels et al. | 705/27 |
| 6,292,092 | B1 | 9/2001 | Chow et al. | 340/5.6 |
| 6,298,336 | B1 | 10/2001 | Davis et al. | 705/41 |
| 6,335,799 | B1 | 1/2002 | Provost | 358/1.4 |
| 6,380,965 | B1 | 4/2002 | Sims et al. | 347/218 |
| 6,386,772 | B1 | 5/2002 | Klinefelter et al. | 400/208 |
| 6,412,991 | B1 | 7/2002 | Klinefelter et al. | 400/240 |
| 6,554,512 | B2 | 4/2003 | Heno et al. | 400/625 |
| 6,582,141 | B2 | 6/2003 | Meier et al. | 400/701 |
| 6,584,290 | B2 | 6/2003 | Kurz et al. | 399/12 |
| 6,629,134 | B2* | 9/2003 | Hayward et al. | 709/217 |
| 6,631,967 | B1 | 10/2003 | Saruta | 347/19 |
| 6,644,771 | B1 | 11/2003 | Silverbrook | 347/19 |
| 6,647,871 | B2 | 11/2003 | Morand | 101/33 |
| 6,663,100 | B2 | 12/2003 | Crowley | 271/165 |
| 6,694,884 | B2 | 2/2004 | Klinefelter et al. | 101/484 |
| 6,758,616 | B2 | 7/2004 | Pribula et al. | 400/624 |
| 6,788,800 | B1 | 9/2004 | Carr et al. | 382/100 |
| 6,816,968 | B1 | 11/2004 | Walmsley | 713/168 |
| 6,850,901 | B1* | 2/2005 | Hunter et al. | 705/26 |
| 6,929,413 | B2 | 8/2005 | Schofield | 400/103 |
| 2002/0051167 | A1 | 5/2002 | Francis et al. | 385/1.14 |
| 2002/0072998 | A1* | 6/2002 | Haines et al. | 705/28 |
| 2002/0091585 | A1* | 7/2002 | Asauchi et al. | 705/26 |
| 2002/0116301 | A1 | 8/2002 | Chapman et al. | 705/29 |
| 2002/0118243 | A1 | 8/2002 | Forman | 347/19 |
| 2002/0171728 | A1 | 11/2002 | Pribula et al. | 347/104 |
| 2002/0180993 | A1 | 12/2002 | Klinefelter et al. | 358/1.1 |
| 2003/0023703 | A1* | 1/2003 | Hayward et al. | 709/217 |
| 2003/0028766 | A1 | 2/2003 | Gass et al. | 713/164 |
| 2003/0046171 | A1* | 3/2003 | Whale | 705/26 |
| 2003/0059050 | A1 | 3/2003 | Hohberger et al. | 380/270 |
| 2003/0139973 | A1* | 7/2003 | Claremont et al. | 705/26 |

| | | | |
|---|---|---|---|
| 2003/0152409 A1 | 8/2003 | Pribula et al. | 400/718 |
| 2003/0167213 A1* | 9/2003 | Jammes et al. | 705/27 |
| 2003/0182587 A1 | 9/2003 | Morrison et al. | 726/17 |
| 2003/0216826 A1 | 11/2003 | Klinefelter et al. | 700/95 |
| 2004/0022572 A1 | 2/2004 | Bungert et al. | 400/248 |

FOREIGN PATENT DOCUMENTS

| | | |
|---|---|---|
| DE | 196 44 306 A1 | 5/1998 |
| EP | 0 195 104 A1 | 9/1986 |
| EP | 0 562 979 A2 | 9/1993 |
| EP | 0 597 135 A1 | 5/1994 |
| EP | 0 659 588 A2 | 6/1995 |
| EP | 0 278 517 A2 | 8/1998 |
| EP | 0 887 197 A2 | 12/1998 |
| EP | 0 924 597 A2 | 6/1999 |
| EP | 1488303 B1 | 3/2003 |
| FR | 2 667 416 | 4/1992 |
| GB | 2 120 821 A | 12/1983 |
| JP | 8-187921 A * | 7/1996 |
| JP | 2001-24838 A * | 1/2001 |
| JP | 2001-215231 A * | 8/2001 |
| WO | WO 86/07480 | 12/1986 |
| WO | WO 95/09084 | 4/1995 |
| WO | WO 96/39656 | 12/1996 |
| WO | WO 98/52762 | 11/1998 |
| WO | WO 98/51508 | 12/1998 |
| WO | WO 99/21713 | 5/1999 |
| WO | WO 99/49379 | 9/1999 |
| WO | WO 00/43932 | 7/2000 |
| WO | WO 03/059632 A1 | 12/2002 |
| WO | WO 03/060811 A2 | 12/2002 |
| WO | WO 2003/019459 A3 | 3/2003 |
| WO | WO 03/079168 A2 | 9/2003 |
| WO | WO 2004/011268 A1 | 2/2004 |

OTHER PUBLICATIONS

Office Action dated Oct. 18, 2005 for U.S. Appl. No. 10/372,011, filed Feb. 21, 2003.

"Notification of Transmittal of the International Search Report or the Declaration" dated Oct. 26, 2005, for International Application No. PCT/US04/29429, filed Sep. 9, 2004.

"Written Opinion of the International Searching Authority" dated Oct. 26, 2005, for International Application No. PCT/US04/29429, filed Sep. 9, 2004.

OrdaCard announces new Internet based high volume secured photo ID card production services, Oct. 1998, Business Wire, Inc.

DataCard Debuts Image and Data Retrieval Software for Enterprise Applications, Apr. 1998, Business Wire, Inc.

www.SmartIDCard.com, Jul. 2002 4 pages, "Card Printing Service" 5 pages, Smart ID Card—Card Printing Services, ID Cards, Card Supplies, Smart Card Solutions.

UbiQ Smart Card Software Majes New FARGO Printers Complete Card-Issuance Systems Issuers Can Print and Personalize Smart Cards Using Pro Series ID Card Printers Combined with Ubiq's Personalization Software, Apr. 1998.

Rapid Logic, Rapid Control, The Architecture for Element Management, Integrated Systems.

Color Business Report, Color, Computers, and Reprographcis, Apr. 10, 1999, vol. 9, No. 4, pp. 9.

U.S. Provisional Patent Application of Gary A. Lenz and Gary M. Klinefelter, U.S. Appl. No. 60/170,987, filed Dec. 15, 1999, entitled "Printer on Laminator With Web Browser".

* cited by examiner

SecureMark Diagnostics Report

AXS Technical Support

7/25/04

Printer: DTC525LC Mag   Serial Number: A301938292

| Property | Current | Factory Default |
|---|---|---|
| Driver Settings: | | |
| Ribbon Type | YMCKO | |
| Lamination Type | | Polyguard |
| Temp | 180 | 180 |
| Dwell Time | 1 | 1 |
| Card Size | CR-80 | |
| Die Sub Intensity | 10 | 15 |
| Resin Heat | 200 | 200 |
| Mag Coercivity | Hi Co | Hi Co |
| Overlay Print Area | VisSecur | none |
| Print All Black with K Panel | no | yes |
| Printer Settings: | | |
| Image Darkness | +20 (4/16/04) | +3 |
| TOF | -2 | -2 |
| Encoder Settings | 44 | 44 |
| Firmware Version | [barcode] | 1.1.1 |
| PC Settings: | | |
| Operating System | | Win2000 |
| Communication Port | | USB 1 |
| Hard Drive Space Available | | 234 M |
| Memory | | 512 M |
| Printer States: | | |
| Door Open | | no |
| Ribbon Installed | | yes |
| RFID Detected | | yes |

FIG. 7

IDENTIFICATION CARD MANUFACTURING SYSTEM SUPPLY ORDERING AND DIAGNOSTIC REPORT

The present application is based on and claims the benefit of U.S. provisional patent application Ser. No. 60/501,932, the content of which is hereby incorporated by reference in its entirety.

FIELD OF THE INVENTION

The present invention generally relates to identification card manufacturing systems and, more particularly, to a diagnostic reports and supply ordering method for said systems.

BACKGROUND OF THE INVENTION

Identification card manufacturing systems generally include a computer, at least one card manufacturing application running on the computer, and at least one identification card manufacturing device such as an identification card printer or laminator. In the case of an identification card printer, the card manufacturing application can combine textual and graphical information to form a print job corresponding to an image that is to be printed by the identification card printer. The print job can then be processed by the identification card printer by printing an image to a card substrate fed from a card supply using a thermal print mechanism or an ink jet print mechanism. The thermal print mechanism utilizes a thermal print ribbon supply, whereas the ink jet print mechanism utilizes an ink cartridge supply. When the identification card manufacturing device is a laminator, the card producing application can control the operation of the identification card laminator to laminate the printed card using an overlaminate supply. Other identification card processing devices, such as data encoders and card flippers, can also be controlled by the identification card manufacturing application.

Such systems are typically shipped with the components configured in accordance with default factory settings. The settings relate to driver settings for the card manufacturing device, component settings for the card manufacturing device (e.g., printer settings), and other default settings. The user of the system has the ability to modify some of the default settings of the system to tailor the system to his or her needs. Unfortunately, modifications to the default settings can complicate troubleshooting efforts should problems arise. It would, therefore, be desirable to be able to quickly identify how the system has been modified from the default settings to assist support personnel in the troubleshooting process.

In an effort to provide improved security from identification card counterfeiting, some consumable supplies are now customized for the user by providing them with a memory containing supply information that can be used to limit the use of the supply with only the user's identification card manufacturing system. One purpose of such a practice is to prevent the generation of fraudulent cards through the unauthorized use of the supplies with other card manufacturing systems.

The supplies and the card manufacturing systems are preferably customized for the user by a particular dealer. It is preferable for the user to contact the same dealer for submitting orders for new supplies as well as to receive support for the user's card manufacturing system.

There is a continuing need to make the use of identification card manufacturing systems as convenient for the user as possible. For example, it would be desirable to improve the ordering process for the consumable supply through use of the supply information contained in the memory of the supply to direct the user to their particular dealer.

SUMMARY OF THE INVENTION

One aspect of the present invention is generally directed to a method of ordering a consumable supply produced by a card manufacturing device of an identification card manufacturing system. In the method, a request to order the consumable supply is received from a user. Next, supply information relating to the supply is retrieved and the supply information is provided to a first web address. Finally, a second web address, which is different from the first web address and is associated with the supply, is retrieved through the first web address based upon the supply information.

Another aspect of the present invention is directed to a diagnostic report for a card manufacturing system that includes a card manufacturing device. The diagnostic report includes a list of current settings including current default settings that match default settings for the device. The current default settings also include modified settings that are different from the default settings for the device. The modified settings are highlighted to thereby visibly distinguish them from the current default settings. Additional embodiments of the invention are directed to a method of generating the diagnostic report.

Other features and benefits that characterize embodiments of the present invention will be apparent upon reading the following detailed description and review of the associated drawings.

BRIEF DESCRIPTION OF THE DRAWINGS

FIG. 7 is a diagnostic report in accordance with embodiments of the invention.

DETAILED DESCRIPTION OF THE PREFERRED EMBODIMENTS

Figure 1:
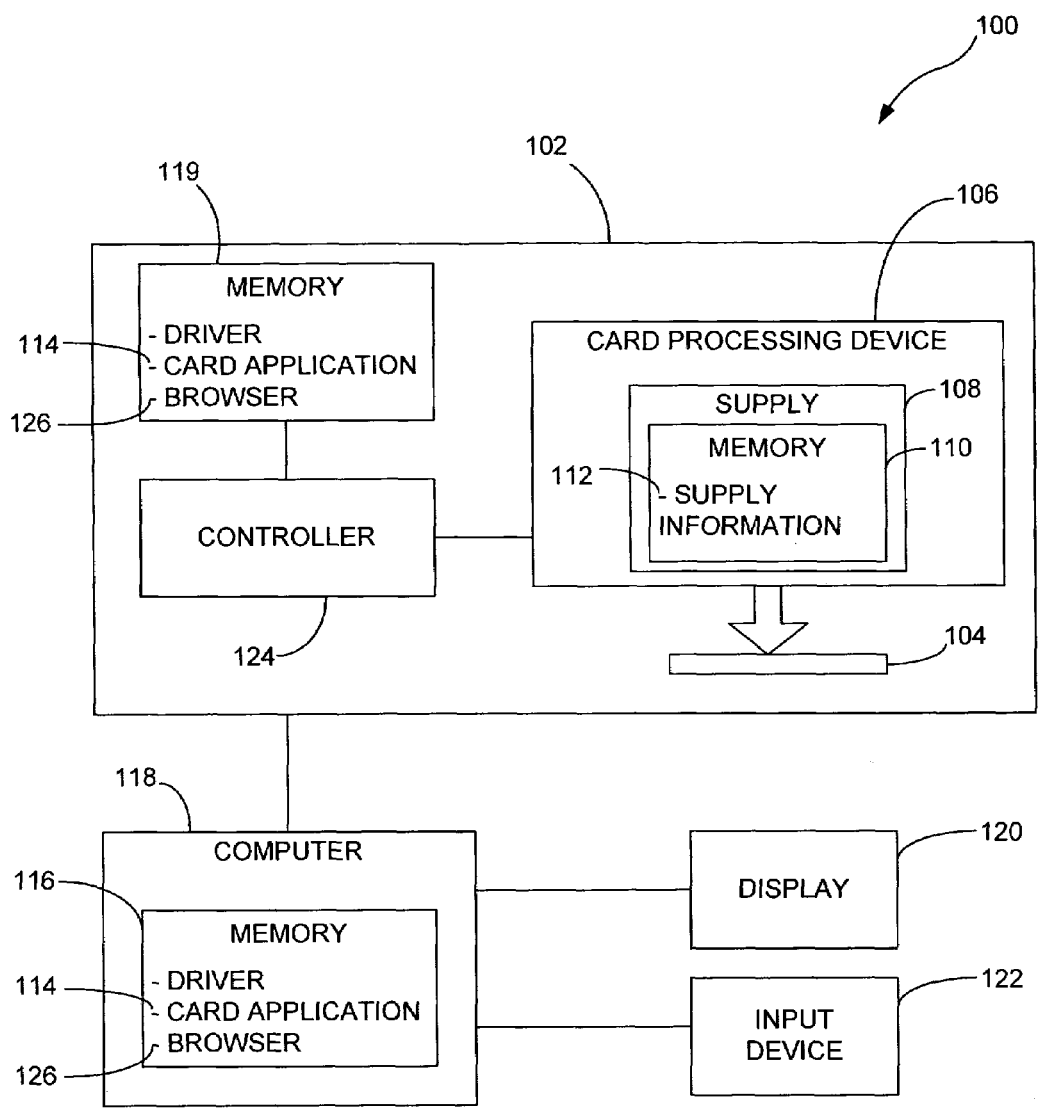
FIG. 1 is a block diagram of an identification card manufacturing system in accordance with embodiments of the invention.

FIG. 1 is a block diagram of an identification card manufacturing system 100 in accordance with embodiments of the invention. The system 100 includes at least one card manufacturing device 102, which operates to process card substrates 104 to form identification cards. For example, the card manufacturing device 102 can be an identification card printer, an identification card laminator, or other card manufacturing device that includes at least one card processing device 106 that utilizes a consumable supply 108.

Identification card printers utilize card processing devices 106 in the form of thermal printheads that are configured to apply dye from a print ribbon supply 108 to a surface of the card substrate 104, or ink jet printheads that are configured to apply an ink supply 108 from an ink cartridge to the surface of the card substrate. Identification card laminators, on the other hand, typically utilize overlaminate supplies 108 including those having security marks, such as holograms, that are applied to printed surfaces of the card substrate 104 using a card processing device 106 in the form of a heated roller and platen.

The consumable supplies 108 preferably include a memory 110, in which supply information 112 is contained. The supply information 112 includes information that identifies the supply 108, such as a part number, dealer information, a default quantity (e.g., starting amounts) of the supply, a customer number, and a price for the supply 108, for example. Additionally, the consumable supply 108 can be a customized supply that includes security data, such as a customer specific security code, which is used to determine whether the supply is authorized for use with the card manufacturing device 102. Unlike traditional supplies, such customized supplies and systems are preferably sold to the user by a specific dealer, who the user must return to for additional customized supplies 108, new card manufacturing devices 102, and other products relating to the user's system 100. Additionally, support for the user's system is preferably provided by the user's dealer. Examples of such supplies 108 are described in U.S. patent application Ser. No. 10/372,011 and U.S. patent application Ser. No. 10/722,377, both of which are assigned to Fargo Electronics, Inc., and are incorporated herein by reference in their entirety.

Typical card manufacturing devices 102 operate to process a card processing job, such as a print job, that is produced by a card producing application 114 stored in memory 116 that is accessible by a computer 118. Alternatively, memory 119 of the card manufacturing device 102 can include the card processing application 114. The user of the system 100 can view an application interface provided on a display 120 and operate the application 114 through an input device 122 of the computer 118, such as a keyboard, mouse, etc., to form the card processing job.

The card-processing job is presented to a controller 124 of the card manufacturing device 102 through a suitable driver application stored in memory 114 of the computer 118 or memory 119 of the card manufacturing device 102. The controller 124 controls the card processing devices 106 of the card manufacturing device 102 to perform the desired operation on the card substrate 104 and complete the processing of the card processing job, in accordance with conventional methods.

Supply Ordering

One aspect of the present invention is directed to a method of ordering the consumable supply 108 for the card manufacturing device 102. The method is generally implemented by a computer application or program, such as the card producing application 114, in combination with a web browser 126. Those skilled in the art understand that other computer programs and applications including applications that may not directly relate to identification card production, such as a security application, could be executed to implement the supply ordering method of the present invention. Accordingly, the card producing application 114, as used herein, is not intended to describe only computer applications that are used to manufacture identification cards, but to also describe computer applications that may serve other purposes than card manufacture.

As with the application 114, the card manufacturing device 102 can include the web browser 126 in the memory 119, as shown in FIG. 1, and as described in U.S. patent application Ser. No. 09/739,080, which is assigned to Fargo Electronics, Inc. of Eden Prairie, Minn.

Figure 2:
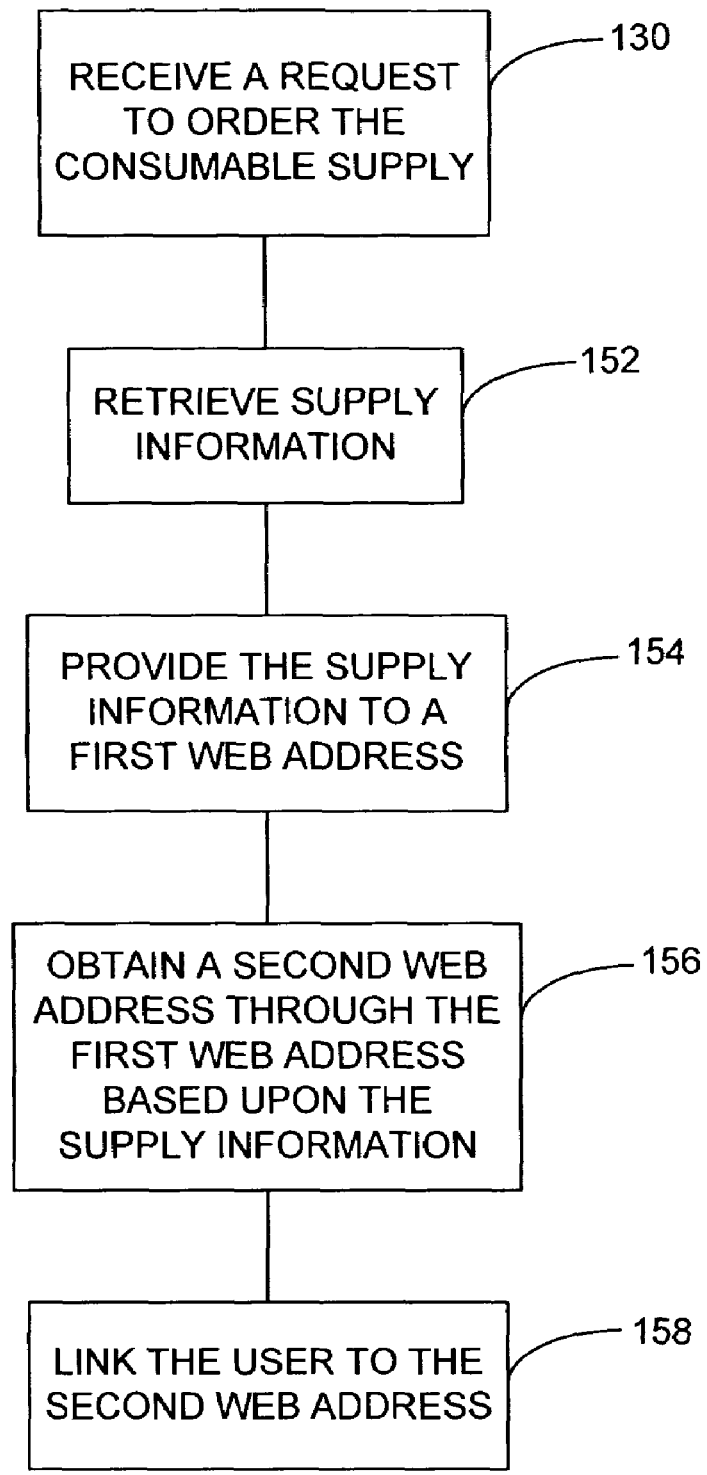
FIG. 2 is a flow chart illustrating a method of ordering a consumable supply in accordance with embodiments of the invention.

FIG. 2 is a flowchart illustrating the online ordering method in accordance with embodiments of the invention. At step 130, a request to order the consumable supply 108 of the card manufacturing device 102 is received from a user of the system 100. The request is provided by the user in response to the selection of an option, such as icon 132 as provided in a window 134, shown in FIG. 3, that is generated by the card producing application 114 or the driver software for the card manufacturing device 102.

Figure 4:
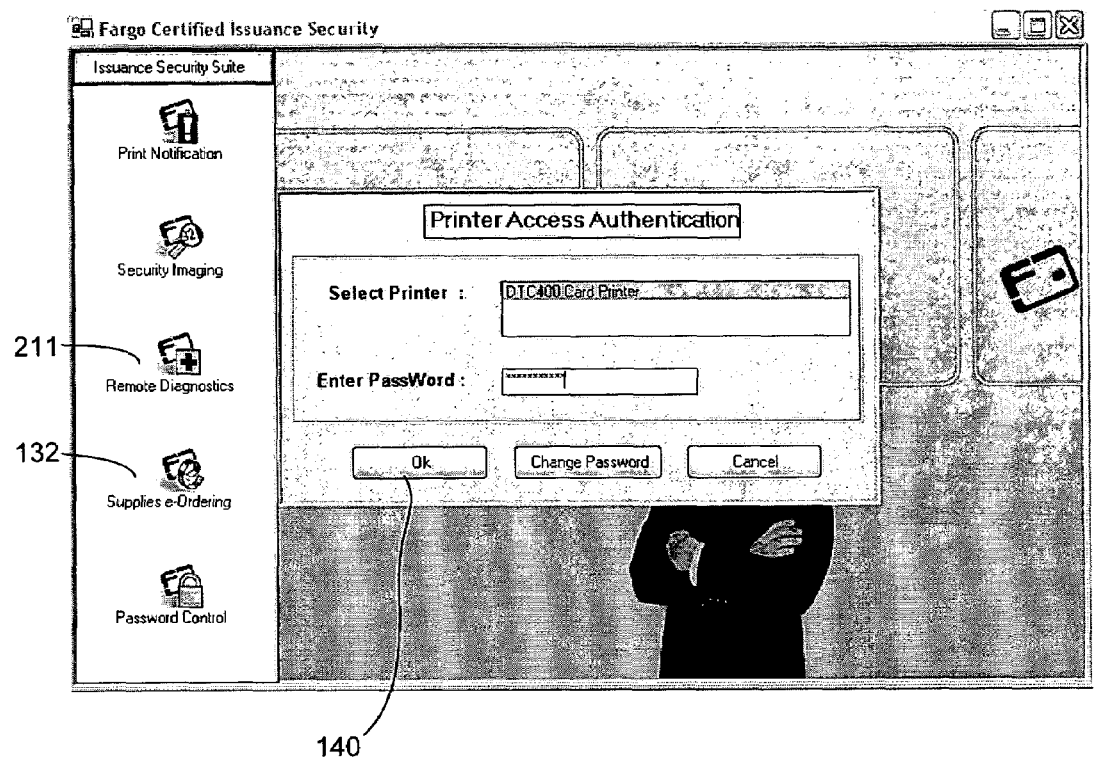

In accordance with one embodiment of the invention, an authorization routine is triggered following the generation of the order request and a security check is made to determine whether the user is authorized to order the consumable supply 108. In accordance with one embodiment of the invention, the authorization routine includes prompting the user to enter an identification of the card manufacturing device 102 and/or a customer number, and a password, as shown in the screen shot of FIG. 4. Once the information has been entered by the user, the user continues by selecting button 140.

In accordance with another embodiment of the invention, a supply ordering option is provided to the user automatically when the amount of the consumable supply 108 is determined to be low. For instance, periodic checks of the supply 108 are made to determine whether the amount of remaining supply has dropped below a threshold level. This can be accomplished through decrementing an initial amount of the supply 108 that is stored in the memory 110 as the supply 108 is used, and notifying the user of the low supply amount once it has dropped below the threshold level. Alternatively, sensors can be used to measure a level of the consumable supply 108, such as ink, and notify the user that the supply 108 has dropped below a threshold level.

Figure 5:
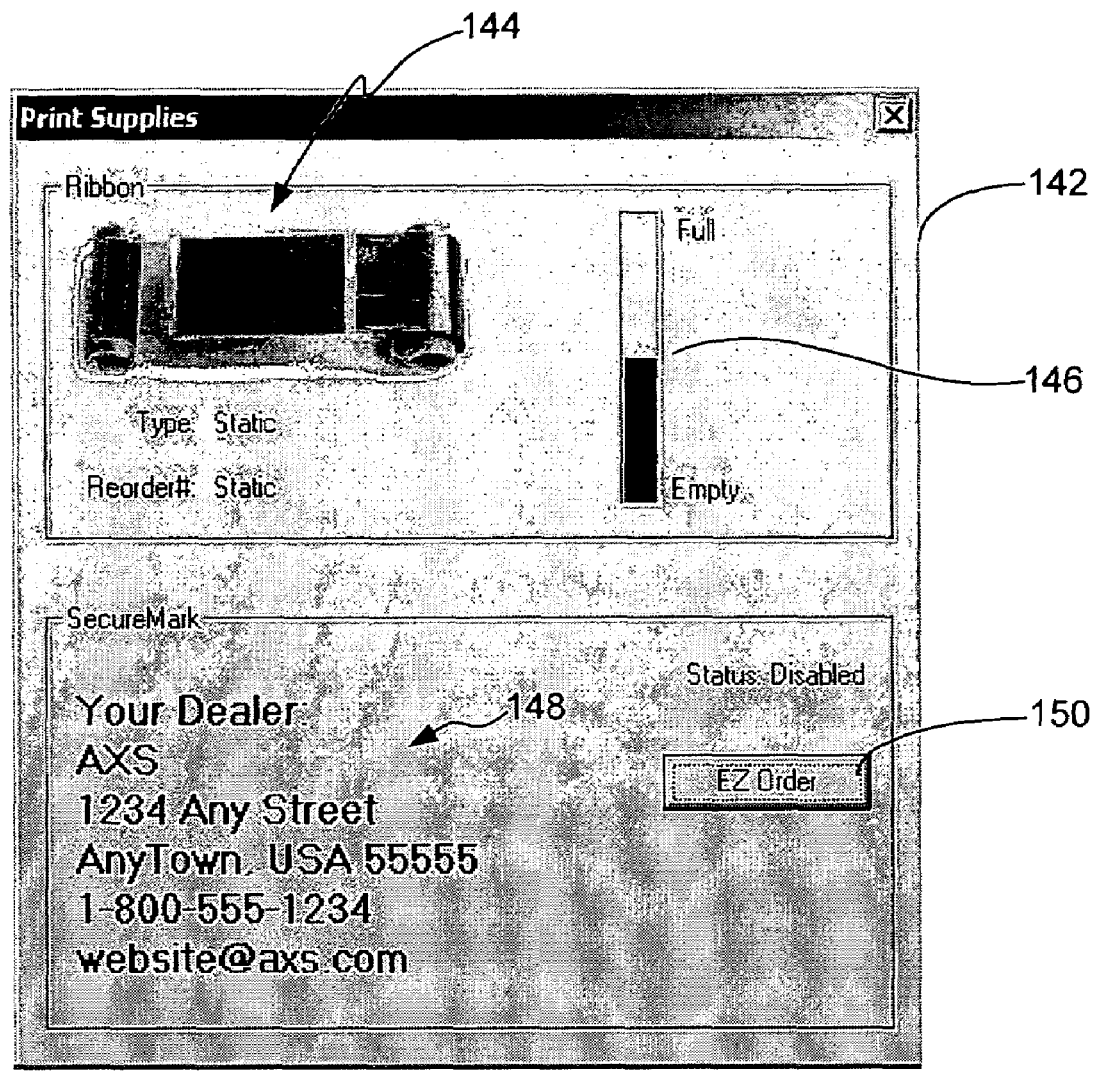
FIG. 5 is a screen shot of a supply information window in accordance with embodiments of the invention.

Upon detection of the low amount of the supply 108, the driver application or card producing application 114 can display a supply information window 142 to the user, such as that illustrated in FIG. 5. The displayed supply information preferably includes, for example, an identification of one or more of the supplies 108 (such as at 144), information regarding the amount of consumable supply remaining (e.g., a bar graph 146, a percentage, etc.), and dealer information 148. A button 150 or other option that can be selected by the user to generate the request to order more of the supply 108.

The supply information can also be displayed to the user prior to the remaining consumable supply 108 dropping below the threshold, through the selection of a print supplies option within the driver application or card producing application 114, the selection of which can produce the window 142 of FIG. 5. As a result, the user can submit a request to order the supply 108 at any time.

Referring again to the flowchart of FIG. 2, at least a portion of the supply information 112 is retrieved, at step 152 of the method. As mentioned above, the supply information 112 can include information that is specific to the supply and/or to the customer or owner of the supply 108. In general, the retrieved supply information 112 can be used to identify, or retrieve information (e.g., contact information) relating to, the customer or user of the system 100, the particular dealer of the user's system and supplies, and/or the card manufacturing device 102. Preferably, the retrieved supply information 112 only provides a unique identifier (e.g., a customer number, dealer number, etc.) that is associated with the desired information such that it can be obtained from a relational database. For example, the supply information 112 can include a parts number for the supply, which may be unique for the particular customer, and/or a customer number that identifies the customer of the supply. Additionally, the supply information 112 can include dealer information for the supply that identifies the user's particular dealer (i.e., one of many dealers), a default quantity of the supply, a price for the supply, customer contact information, and other information related to the supply and/or the customer.

In accordance with one embodiment of the invention, at least some of the supply information 112 is retrieved from the memory 110 that is attached to the supply 108. A discussion of such a supply and the methods of customizing card manufacturing devices 102 and supplies 108 for limited use is provided in U.S. patent application Ser. No. 10/372,011, which is assigned to Fargo Electronics, Inc. and is hereby incorporated herein by reference in its entirety. Additional supply information can be retrieved from other conventional sources, such as memory 116 that is accessible by the computer 118, memory 119 of the device 102, and other sources.

At step 154 of the method, the retrieved supply information 112 is provided to a first web address. The first web address generally corresponds to a master web site whose server has access to a preferably secure database that contains information that is associated with the retrieved supply information 112.

At step 156, a second web address is obtained through the first web address based upon the retrieved supply information 112. The second web address is different from the first web address and generally corresponds to a dealer web site where the supply 108 can be ordered by the user in accordance with conventional methods. In accordance with one embodiment of the invention, the second web address is retrieved from the secure database and is associated with the retrieved supply information 112. In addition to the second web address, the secure database can also retrieve other information based upon the supply information 112, such as dealer contact information, order history, and other information relating to the supply 108 and/or the customer of the supply 108.

Figure 6:
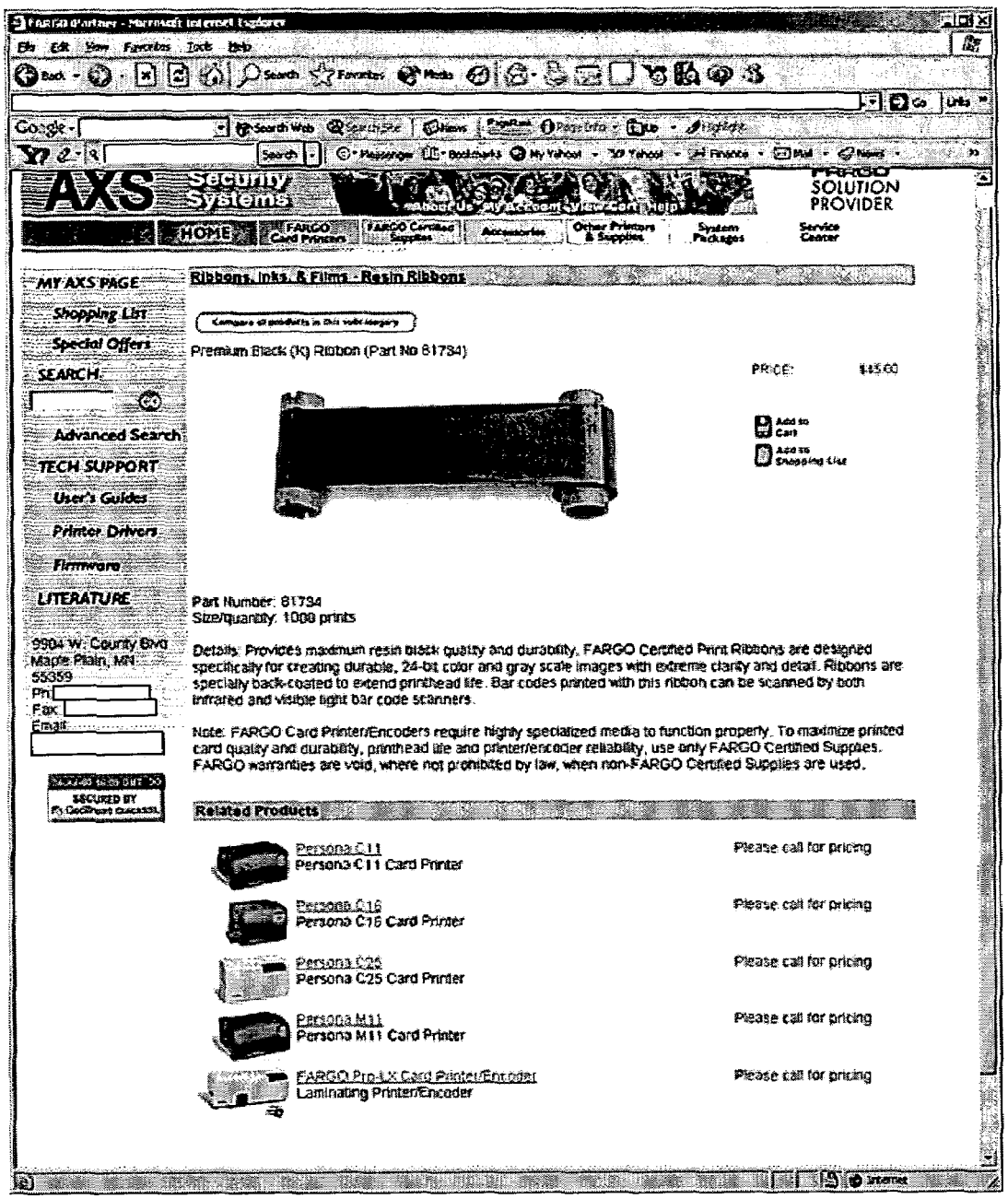
FIG. 6 is a screen shot of an exemplary web page that is associated with a second web address in accordance with embodiments of the invention.

In accordance with one embodiment of the invention, the user is linked to the second web address, at step 158 of the method. An exemplary web page corresponding to the second web address is illustrated in FIG. 6, at which the user can preferably obtain information about the supply 108 and begin the ordering process for the supply 108. The steps 152, 154, 156 and 158 are preferably performed automatically upon receipt of the order request. However, the user may be prompted at times to ender a customer number or other identification and a password to prevent unauthorized people from ordering the supply 108.

Diagnostic Report

Another aspect of the present invention relates to a diagnostic report 200 for the system 100, an exemplary display of which is provided in FIG. 7. The diagnostic report 200 generally provides information about the system 100 including the card manufacturing device 102 and other components. This information can be divided into various categories such as, for example, driver settings 202, card manufacturing device settings including printer or laminator settings 204, computer settings 206, and status information 208 (e.g., card manufacturing device states). Diagnostic report 200 can also include other types of information including card manufacturing device information such as a model or serial number, customer information such as a customer number, and dealer information that includes the name of the dealer, contact information for the dealer, and other useful information. The diagnostic report 200 can be submitted to technical support, which is preferably provided by the user's specific dealer, to assist in troubleshooting the system 100.

The information contained in the diagnostic report can be retrieved from the memory 119 of the device 102, the memory 110 of the supply 108, the memory 116 that is accessible by the computer 118, provided to the user on a CD, or otherwise accessible by the system 100.

Figure 3:
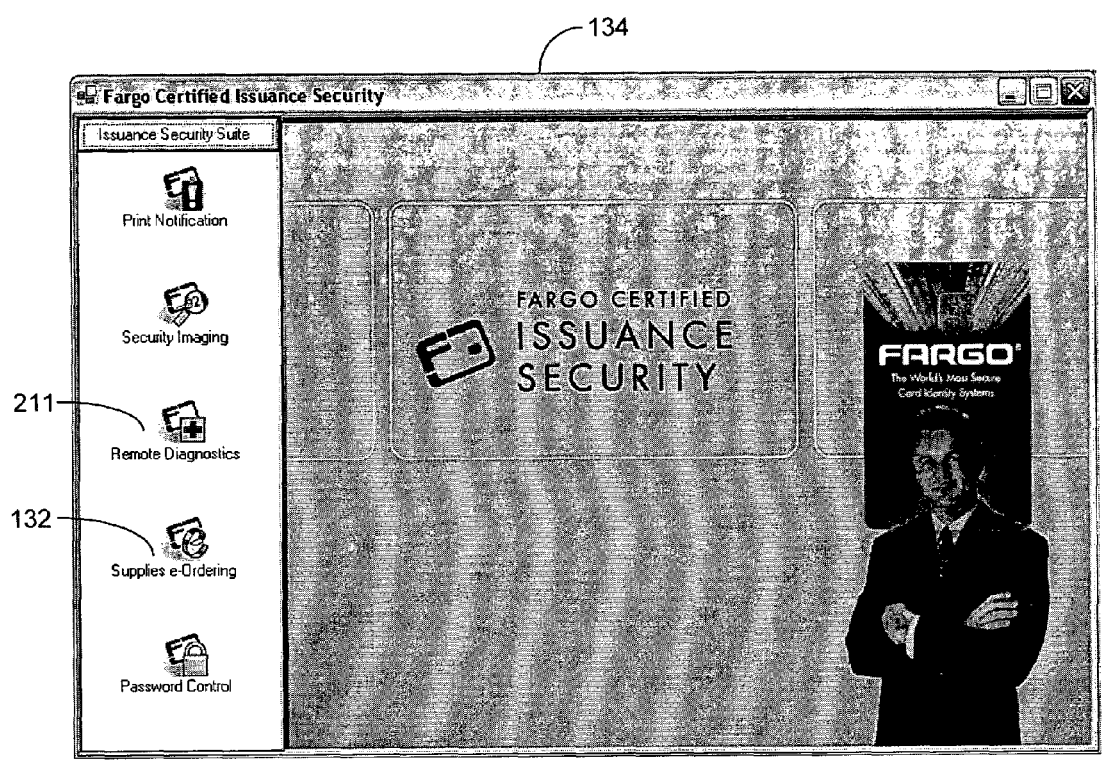
FIGS. 3 and 4 are a screen shots of an interface for an identification card manufacturing system in accordance with embodiments of the invention.
Figure 8:
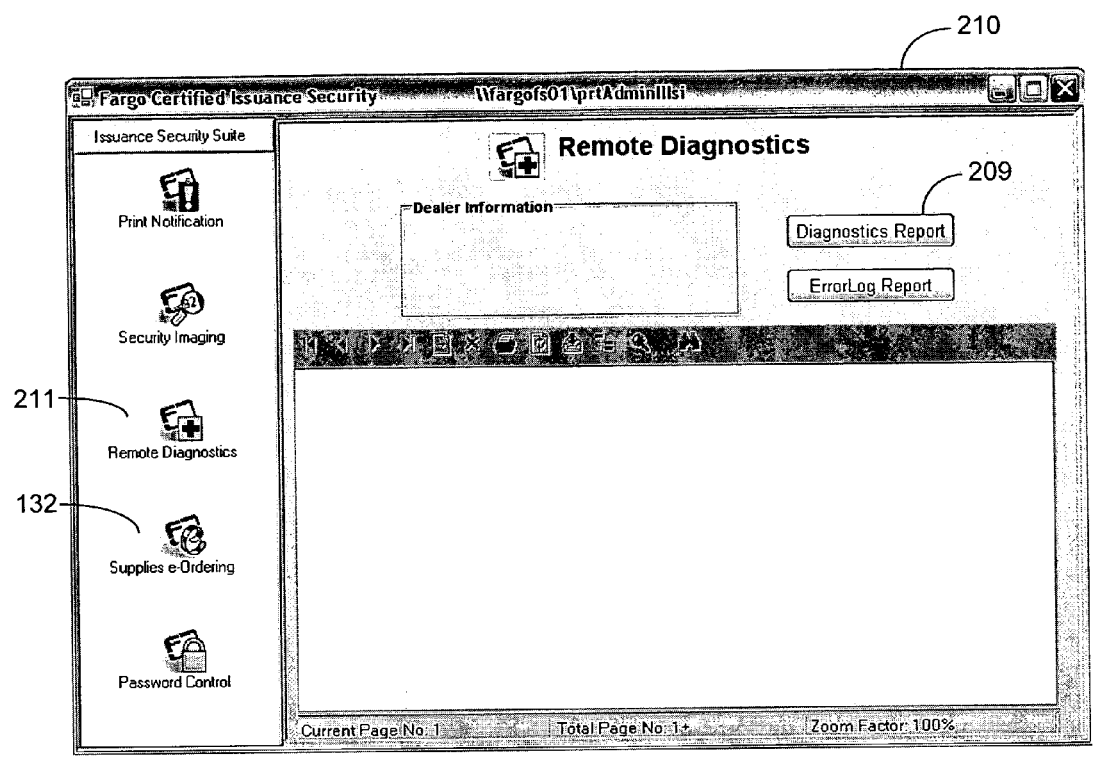
FIG. 8 is a screen shot of a diagnostic window in accordance with embodiments of the invention.

In accordance with one embodiment of the invention, an option, such as a button 209, for generating the diagnostic report 200 is provided in a diagnostics window 210 (FIG. 8) that is accessed by selecting the appropriate option 211 in the main device window 134 (FIG. 3). The diagnostics window 210 is generated by the card producing application 114 or the driver software for the card manufacturing device 102. The diagnostic report 200 is preferably automatically generated in response to the selection of the button 209, or in response to another request for the generation of the diagnostic report 200.

One embodiment of the diagnostic report 200 includes a list of current settings, generally designated as 212, that includes current default settings 214 and modified settings 216 for the card manufacturing device 102. The current default settings 214 match the default settings for the card manufacturing device 102 that are set at the manufacturing facility or dealer. The modified settings 216 are different from the default settings for the card manufacturing device 102, including the current default settings 214, and are highlighted in the diagnostic report 200 to thereby visibly distinguish them from the current default settings 214.

The highlighting of the modified settings 216 allows the reviewer of the diagnostic report 200 to quickly assess where modifications have been made to the system 100 in order to speed up the troubleshooting process. Many different methods of highlighting the modified settings 216 can be used to visibly distinguish them from the current default settings 214. For example, the modified settings 216 can be presented in a different color (see e.g., the current "Die Sub Intensity" setting) as compared to the current default settings 214 (see e.g., the current "Temp" setting), or the modified settings 216 can be presented in a different font or size (see e.g., the current "Overlay Print-Areal" setting) as compared to the current default settings 214.

Additional techniques that can be applied to either the modified settings 216 or the current default settings 214 to highlight and visibly distinguish the modified settings 216 from the current default settings 214 include, for example, underlining (see e.g., the current "Image Darkness" setting), surrounding the setting in a text box (see e.g., the current "Firmware Version" setting), or presenting the modified settings 216 with a different colored background than the current default settings 214 (see e.g., the current "Firmware Version" setting). It should be understood that the present invention is not limited to the above list of highlighting techniques and that many other techniques can be used to provide the desired visibly distinguishing characteristic to the modified settings as compared to the current default setting.

Diagnostic report 200 can also include a list of the default settings 230 that were originally set at the factory. The default settings 230 are preferably positioned adjacent to the corresponding current setting 212. Alternatively, the default setting 230 can be provided adjacent to only the modified settings 216.

In accordance with another embodiment of the invention, additional troubleshooting assistance can be provided by listing a date 232 at which the modified settings 216 came into effect adjacent each modified setting 216.

Figure 9:
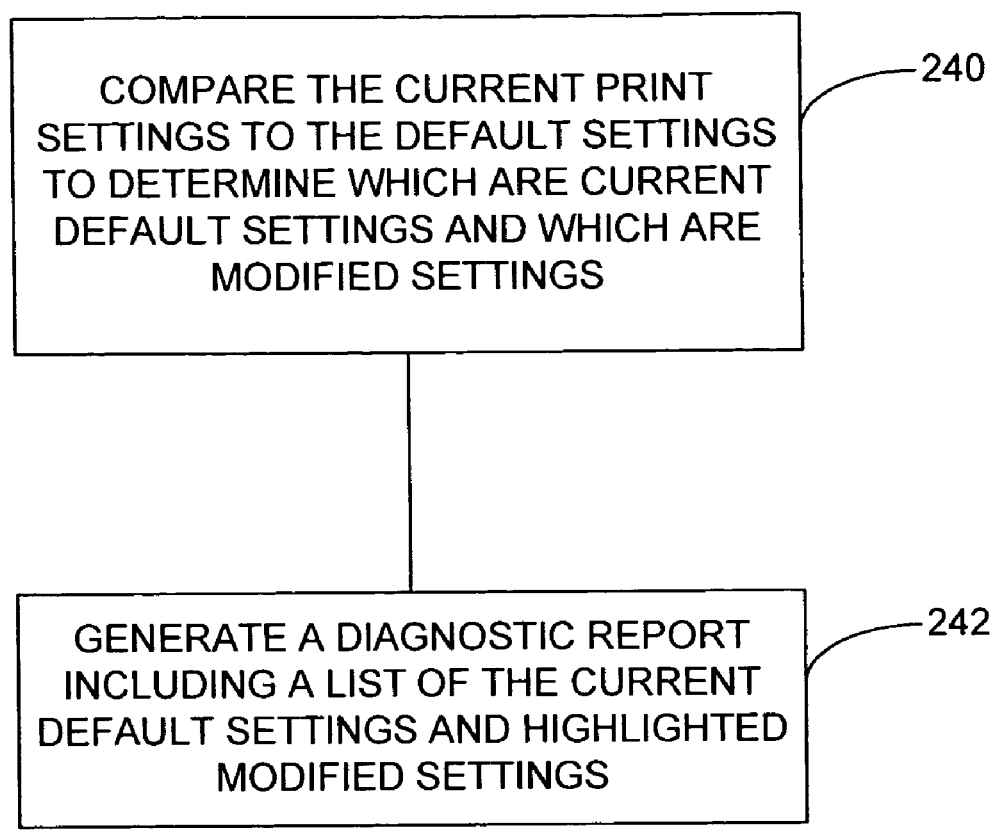
FIG. 9 is a flowchart illustrating a method of generating a diagnostic report for a card manufacturing system in accordance with embodiments of the invention.

One embodiment of the present invention is directed to a method of generating the diagnostic report 200, a flowchart of which is provided in FIG. 9. At step 240 of the method, the current print settings 212 for the card manufacturing device 102 are compared to the default settings 230 to determine which of the current print settings 212 are current default settings 214 that match the corresponding default settings 230, and which are modified settings 216 that do not match the corresponding default settings 230. Finally, at step 242, a diagnostic report 200 is generated including a list of the current default settings 214 and the modified settings 216 as described above. Accordingly, the modified settings 216 are highlighted to thereby visibly distinguish them from the current default settings 214.

Although the present invention has been described with reference to preferred embodiments, workers skilled in the art will recognize that changes may be made in form and detail without departing from the spirit and scope of the invention.

What is claimed is:

1. A method of ordering a consumable supply of a card manufacturing device comprising steps of:
   receiving a request to order a consumable supply of the device from a user;
   retrieving supply information including a unique identifier, wherein the supply information is contained in a memory of the supply;
   providing the supply information to a first web address; and
   retrieving a second web address through the first web address based upon the unique identifier, wherein the second web address is different from the first web address and is associated with the supply.

2. The method of claim 1, including steps of:
   checking whether the consumable supply is low;
   notifying a user of the device that the supply is low; and
   providing supply ordering options to the user.

3. The method of claim 1 including automatically linking the user to the second web address.

4. The method of claim 1, wherein the supply information includes information selected from a group consisting of a part number for the consumable supply, dealer information for the supply, a default quantity of the supply, a customer number, and a price for the supply.

5. The method of claim 1, including providing ordering options to the user for the supply at the second web address.

6. The method of claim 1, wherein retrieving supply information comprises retrieving supply information from the card manufacturing device.

7. The method of claim 1, wherein providing the supply information to the first web address comprises automatically providing the supply information to the first web address.

8. The method of claim 1 and further comprising prompting the user to enter an identification number and a password after receiving the request to order the consumable supply.

9. The method of claim 8, wherein the entered identification number relates to the card manufacturing device.

10. The method of claim 1, wherein the first web address corresponds with a master website that retrieves information related to dealer contact information and order history.

11. The method of claim 1, wherein retrieving supply information including a unique identifier comprises retrieving supply information including a unique identifier that associates the supply to the customer.

12. A method of ordering a consumable supply of a card manufacturing device comprising steps of:
    receiving a request to order a consumable supply of the device from a user;
    retrieving supply information contained in a memory of the supply including a unique identifier that associates the supply to a customer; and
    providing the supply information to a first web address.

13. The method of claim 12, including steps of:
    checking whether the consumable supply is low;
    notifying a user of the device that the supply is low; and
    providing supply ordering options to the user.

14. The method of claim 12 including automatically linking the user to a second web address.

15. The method of claim 12, wherein the supply information includes information selected from the group consisting of a part number for the consumable supply, dealer information for the supply, a default quantity of the supply, a customer number, and a price for the supply.

16. The method of claim 12, wherein retrieving supply information comprises retrieving supply information from the card manufacturing device.

17. The method of claim 12, wherein providing the supply information to the first web address comprises automatically providing the supply information to the first web address.

18. The method of claim 12 and further comprising prompting the user to enter an identification number and a password after receiving the request to order the consumable supply.

19. The method of claim 18 wherein the entered identification number relates to the card manufacturing device.

* * * * *